Figures 1, 2:
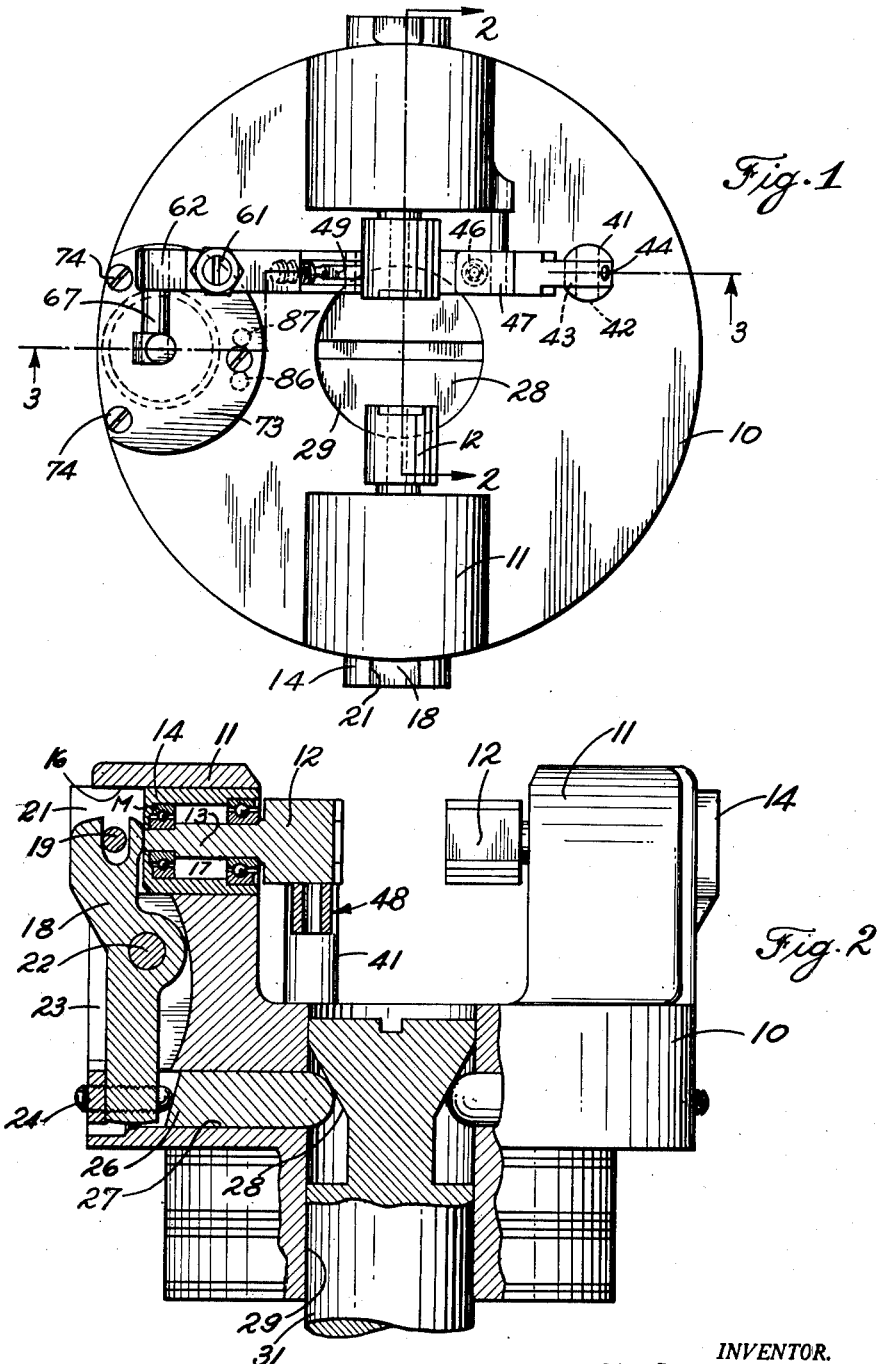

May 13, 1952 F. HUNZIKER 2,596,484
INDEXING CHUCK

Filed Aug. 16, 1949 2 SHEETS—SHEET 1

INVENTOR.
FRED HUNZIKER
BY
Richey Watts
ATTORNEYS

May 13, 1952 F. HUNZIKER 2,596,484
INDEXING CHUCK

Filed Aug. 16, 1949 2 SHEETS—SHEET 2

INVENTOR.
FRED HUNZIKER
BY
Richey Watts
ATTORNEYS

Patented May 13, 1952

2,596,484

UNITED STATES PATENT OFFICE 2,596,484

INDEXING CHUCK

Fred Hunziker, University Heights, Ohio, assignor to The Weatherhead Company, Cleveland, Ohio, a corporation of Ohio Application August 16, 1949, Serial No. 110,653

10 Claims. (Cl. 279—5)

This invention relates to chucks, and more particularly to chucks wherein the work piece may be rotated or indexed without stopping the rotation of the chuck body.

The principal object of the invention resides in providing an indexing chuck wherein the parts are of rugged construction and may still be fitted to a chuck of relatively small diameter. Chucks of the type to which this invention relate are commonly employed in mass production operations, and accordingly must be simple and sturdy. In the larger size chucks (such as those wherein the body is in the neighborhood of eight inches in diameter or greater) adequate space is available for the provision of rugged indexing and actuating mechanism; but, in the smaller chucks (such as in the seven inch diameter chucks or smaller) difficulty has arisen in the provision of a heavy duty construction for the jaw opening and closing mechanism for the indexing mechanism and its actuating means.

I have found that by mounting an actuating cylinder adjacent the periphery of the chuck and by forming the indexing mechanism so that it can be actuated from a point adjacent the chuck periphery, adequate space for all the mechanical elements on the chuck is provided even though the elements may be of heavy-duty construction. By mounting the indexing cylinder on the chuck body, I have, by means of a simple and effective fluid inlet arrangement for the cylinder, eliminated mechanisms which formerly must extend through the chuck body and have also eliminated the usual collars and forks or the like which must be disposed behind the chuck. This is another advantage in that in smaller machine tools capable of using smaller size chucks, there may not be adequate space behind the chuck body for the indexing actuating mechanism. This construction has the added advantage that even in a smaller diameter chuck, adequate room is available for the provision of an exceptionally sturdy jaw opening and closing arrangement.

The manner in which these and other objects and advantages may be obtained will be apparent from the following detailed description of a preferred form of the invention.

Figure 3:
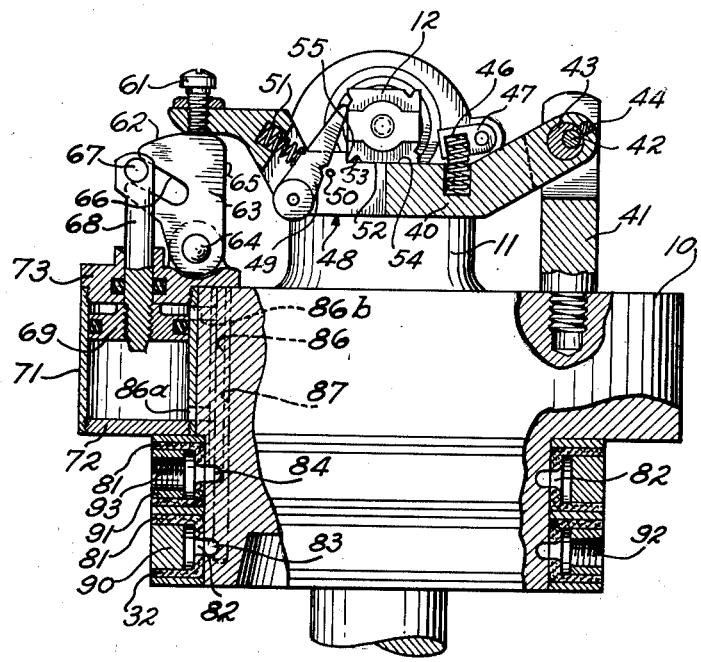
Figure 4:
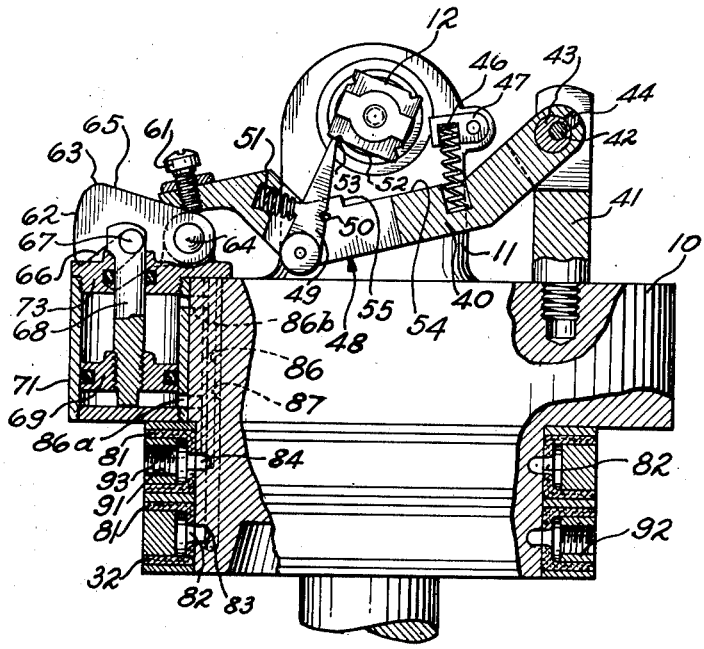

In the drawings:

Fig. 1 is a plan or face view of the chuck;
Fig. 2 is a section on 2—2 of Fig. 1;
Fig. 3 is a section on 3—3 of Fig. 1; and
Fig. 4 is a section like Fig. 3 with the indexing parts in their retracted position.

Referring to the drawings, the chuck body 10 is formed with suitable means for attachment to the spindle of a lathe or other machine tool, details of the attachment forming no part of the invention and depending upon the nature of the machine tool itself. Extending axially forwardly from the face of the chuck is a pair of brackets 11 which mount the radial work-holding members 12. These members may be provided with the usual independently attachable jaws (not shown) arranged for gripping the piece to be worked upon in the machine. Members 12 have shanks 13 which rotatably mount them in hollow plungers 14 slidable in diametric apertures 16 and in the brackets. Anti-friction bearings 17 may be employed for mounting the indexing members but plain bearings will also be suitable in some instances.

The plungers 14 are reciprocated under control of the operator by means of lever 18, forked at one end to engage pins 19 extending across slots 21 on the plungers. The levers are pivoted to the body as at 22 and lie within slots 23 in the body. The levers have adjustable contact bolts 24 engageable with plungers 26 disposed in bores 27 in the body. The plungers are expelled for gripping the work piece by the retraction of conical cam 28 disposed in bore 29, the cam engaging the inner end of the plunger bolts. Continuation 31 of the cam extends through the machine spindle and may be actuated by any suitable means known in the art to open and close the jaws.

The indexing mechanism may be employed in connection with either of the indexing wheel members 12. It comprises a lever 40 pivotally mounted to one side of the indexing wheel by means of a post 41 and a pivot 42. To permit precise adjustment of the parts an adjustable eccentric bushing 43 may be held by a set screw 44 in the end of the lever. The lever is urged away from the indexing wheel 12 by means of a spring 46 engaging the lever and backed up by a lug 47 carried by the associated bracket 11. The lever 40 is slotted as at 48 to receive a pawl 49 urged toward a limit pin 50 by means of a spring 51.

The indexing wheel has flat surfaces 52, there being a notch 53 at each corner thereof for interaction with the pawl. The lever 40 has a surface 54 and a shoulder 55 for engaging two sides of the indexing wheel to prevent its rotation when the parts are in their work position. The end of the lever opposite the pivot is provided with an adjustable abutment screw 61 which engages a surface 62 on a cam 63 pivotally mounted as at 64 on the body. The cam acts as part of the actuating means for the lever and is slotted as at 66 for the reception of a pin 67 mounted at piston rod 68 connected to a double-acting piston 69. The actuating cylinder is mounted in a recess in the periphery of the chuck body. It includes a tube 71 and a bottom wall 72, the tube being attached to a cover plate 73 fastened to the body by means of fasteners 74.

In order to admit air or other fluid under pressure to the opposite sides of the piston, the chuck is formed with a pair of annular grooves in which rest annular sealing members 81 of U-shaped cross-section. The sealing members may be of felt, leather, rubber, or the like and are apertured as at 82 to establish communication with annular grooves 83 and 84 in the chuck body. The grooves communicate with opposite ends of the cylinder by means of passageways 86 and 87 respectively drilled in the chuck body and closed by the cover 73 at one end. The body is cross-drilled as at 86a and 86b to complete the communication between the annular grooves and the actuating cylinder.

The fluid admission system is completed by the annular members 90 and 91 which make sealing engagement within the seals 81. These members are stationary and are connected to separately controlled sources of fluid under pressure by means of suitable connections to inlet ports 92 and 93. The inlet ports are connected to a two-way valve of any suitable design so that within control of the operator, fluid, such as air, under pressure may be admitted to one or the other of the parts 92 or 93 to advance or retract the piston 69 and index the chuck.

The operation of the indexing mechanism just described is as follows: Assume that the parts are disposed as shown in Fig. 3, which is the work position. The cam surface 62 firmly holds lever 48 so that its surface 54 and its shoulder 55 are against the adjacent surfaces of the indexing wheel 12 whereby rotation of the indexing wheel is firmly prevented in both directions. Fluid pressure may be maintained beneath the piston to hold the parts in the work position.

When it is desired to index the chuck, the connections are reversed whereupon port 86a is open to the exhaust whereas 86b is connected to the source of fluid under pressure. This retracts the piston rod and pivots the cam 63 so that cam surface 62 slides from under the bolt 61 on the lever. Spring 46 now moves the lever away from the indexing wheel as pawl 49 slides across the face of the index wheel. In its retracted position the indexing mechanism is arranged so that the pawl catches in the notch 53 at the corner of the face 52 formerly engaged by the lever.

The air connections may now be again reversed to complete the indexing operation. When this occurs the piston rod is extended from the cylinder and the surface 65 of cam 63 rides against the nose of the lever 40 forcing it toward the indexing wheel. Pawl 49 now turns the indexing wheel which continues to be turned by the pawl until the edge 54 of the lever engages the wheel. The wheel will now have been turned around toward its next indexed position far enough so that pressure of lever 40 against the wheel will complete rotation of the wheel independently of the pawl, and upon the completion of the piston stroke the parts are again in the position shown in Fig. 3. It will be noted that the indexing stroke occurs when the piston moves away from the closed end of the cylinder, which stroke is more powerful than the retract stroke due to reduction of the effective retract piston area by the piston rod. Thus maximum force is available to index and to hold the index wheel in its work position. The eccentric 43 may be adjusted so that a good contact is had between the lever and the indexing wheel.

It can be seen that the arrangement whereby the lever is pivoted at one end to one side of the indexing wheel and is actuated at the other end and extends between the wheel and the body is one wherein a minimum of space and maximum of rigidity are obtained. By mounting the actuating cylinder to one side of the chuck ample room is provided for the central jaw operating mechanism. No rods or other devices need extend through the chuck to be operated by collars or the like between the chuck and the head stock or other support for the spindle. The means for admitting fluid under pressure to the cylinder is simple and dependable, may be readily mounted in the chuck body and does not protrude from the body.

Having completed a detailed description of my invention, it will be apparent that various modifications thereof may be made without departing from the scope of the invention defined in the appended claims.

What is claimed is:

1. In an indexing chuck, a chuck body arranged for mounting on a rotating spindle, work-gripping means rotatably mounted on said body, indexing mechanism for said work-gripping means, and actuating means for said indexing mechanism, said actuating means comprising a cylinder rotatable with said body, a piston in said cylinder, means connecting said piston with said indexing mechanism, a stationary fluid inlet annulus making sealing engagement with said body, and fluid passageway means in said body between said annulus and cylinder.

2. In an indexing chuck, a chuck body arranged for mounting on a rotating spindle, work-gripping means rotatably mounted on said body, indexing mechanism for said work-gripping means, and actuating means for said indexing mechanism, said actuating means comprising a cylinder rotatable with said body, a piston in said cylinder, said cylinder and piston being double-acting, means connecting said piston with a pair of annular grooves in said body, annular seals in said grooves, said indexing mechanism, a stationary fluid inlet annulus in each groove making sealing engagement with the associated seal, and fluid passageway means in said body between each annulus and one end of the cylinder.

3. In an indexing chuck, a chuck body arranged for mounting on a rotating spindle, a work-gripping means rotatably mounted on said body, indexing mechanism for said work-gripping means, and actuating means for said indexing mechanism, said actuating means comprising a cylinder rotatable with said body, the axis of said cylinder being generally parallel to and spaced from the chuck axis of rotation, a piston in said cylinder, means connecting said piston with said indexing mechanism, a stationary fluid inlet annulus making sealing engagement with said body, and fluid passageway means in said body between said annulus and cylinder.

4. In an indexing chuck, a chuck body arranged for mounting on a rotating spindle, work-gripping means rotatably mounted on said body, indexing mechanism for said work-gripping means, and actuating means for said indexing mechanism, said actuating means comprising a cylinder rotatable with said body, a piston in said cylinder, said cylinder and piston having their axes parallel to that of the chuck and spaced therefrom, said piston being double-acting, means connecting said piston with a pair of annular grooves in said body, annular seals in said grooves, said indexing mechanism, a stationary fluid inlet annulus in each groove making sealing engagement with the associated seal, and fluid passageway means in said body between each annulus and one end of the cylinder.

5. In an indexing chuck, a chuck body arranged for mounting on a rotating spindle, work-gripping means rotatably mounted on said body, indexing mechanism for said work-gripping means, said indexing mechanism comprising an indexing wheel for one of said work-gripping means, said indexing wheel having a plurality of flat faces with a notch at each face thereof, a lever pivoted to said body to one side of said indexing wheel and extending across the face thereof a pawl on said lever for engaging one of said notches, and actuating means for said indexing mechanism, said actuating means comprising a cylinder rotatable with said body, a piston in said cylinder, means connecting said piston with said lever on the other side of said indexing wheel from said lever pivot, a stationary fluid inlet annulus making sealing engagement with said body, and fluid passageway means in said body between said annulus and cylinder.

6. In an indexing chuck, a chuck body arranged for mounting on a rotating spindle, a work-gripping means rotatably mounted on said body, indexing mechanism for said work-gripping means, said indexing mechanism comprising an indexing wheel for one of said work-gripping means, said indexing wheel having a plurality of flat faces with a notch at each face thereof, a lever pivoted to said body to one side of said indexing wheel and extending across the face thereof a pawl on said lever for engaging one of said notches, actuating means for said indexing mechanism, said actuating means comprising a cylinder rotatable with said body, the axis of said cylinder being generally parallel to and spaced from the chuck axis of rotation, a piston in said cylinder, means connecting said piston with said lever on the opposite side of said indexing wheel from said lever pivot, a stationary fluid inlet annulus making sealing engagement with said body, and fluid passageway means in said body between said annulus and cylinder.

7. In an indexing chuck, a chuck body arranged for mounting on a rotating spindle, a pair of opposed brackets extending axially forward from the face of said body, work-gripping means rotatably mounted in each bracket, indexing mechanism for said work-gripping means comprising an indexing wheel for one of said work-gripping means, a lever having one end pivoted to said body to one side of said indexing wheel, said lever extending across the face of said wheel between the wheel and the body, a pawl on said lever for engaging said wheel, and actuating means connected to the other end of said lever at the other side of said wheel for moving said lever toward and away from said indexing wheel.

8. In an indexing chuck, a chuck body arranged for mounting on a rotating spindle, work-gripping means rotatably mounted on said body, indexing mechanism for said work-gripping means, and actuating means for said indexing mechanism, said actuating means comprising a cylinder mounted eccentrically on and rotatable with said body, a piston in said cylinder, means connecting said piston with said indexing mechanism, and fluid passageway means in said body leading to said cylinder.

9. In an indexing chuck, a chuck body arranged for mounting on a rotating spindle, work-gripping means rotatably mounted on said body, indexing mechanism for said work-gripping means, and actuating means for said indexing mechanism, said actuating means comprising a double-acting cylinder mounted on and rotatable with said body, said cylinder having one closed end and one end with a central bore, a piston in said cylinder, a piston rod extending through said cylinder bore, means connecting said piston rod with said indexing mechanism, the motion of said piston away from said closed cylinder end being the indexing stroke, and fluid passageway means in said body leading to said cylinder.

10. In an indexing chuck, a chuck body arranged for mounting on a rotating spindle, work-gripping jaws rotatably mounted on said body, axially reciprocable means for opening and closing said jaws, indexing mechanism for said work-gripping jaws, and actuating means for said indexing mechanism, said actuating means comprising motor means mounted on said body to one side of the center of rotation thereof, said motor means rotating with said body, means connecting said motor means with said indexing mechanism, and a rotary slip joint on said body connected to said motor means and adapted to connect to a mating stationary joint part to provide power for said motor means.

FRED HUNZIKER.

REFERENCES CITED

The following references are of record in the file of this patent:

UNITED STATES PATENTS

| Number | Name | Date |
| --- | --- | --- |
| 1,801,602 | Hunziker | Apr. 21, 1931 |
| 2,349,119 | Soule | May 16, 1944 |
| 2,362,072 | Hunziker | Nov. 7, 1944 |
| 2,362,146 | Mariotte | Nov. 7, 1944 |
| 2,469,198 | La Pointed | May 3, 1949 |
| 2,477,773 | Soussloff et al. | Aug. 2, 1949 |
| 2,480,715 | De Groff | Aug. 30, 1949 |
| 2,502,260 | Hunziker | Mar. 28, 1950 |